(12) United States Patent
Chen

(10) Patent No.: US 9,073,459 B2
(45) Date of Patent: Jul. 7, 2015

(54) COLLAPSIBLE SUPPORT DEVICE AND CHILD SAFETY SEAT THEREWITH

(71) Applicant: Hong-Bo Chen, Guangdong (CN)

(72) Inventor: Hong-Bo Chen, Guangdong (CN)

(73) Assignee: BP Children's Products HK Co., Limited, Kwai Chung, N.T. (HK)

( * ) Notice: Subject to any disclaimer, the term of this patent is extended or adjusted under 35 U.S.C. 154(b) by 161 days.

(21) Appl. No.: 13/870,994

(22) Filed: Apr. 26, 2013

(65) Prior Publication Data

US 2013/0313872 A1 Nov. 28, 2013

(30) Foreign Application Priority Data

May 25, 2012 (CN) .......................... 2012 1 0168704

(51) Int. Cl.
*B60N 2/28* (2006.01)
(52) U.S. Cl.
CPC .............. *B60N 2/2857* (2013.01); *B60N 2/286* (2013.01); *B60N 2/2863* (2013.01)
(58) Field of Classification Search
CPC ......... B60N 2/28; B60N 2/2857; B60N 2/286
USPC ......................................... 297/250.1, 256.13
See application file for complete search history.

(56) References Cited

U.S. PATENT DOCUMENTS

| 4,186,962 A | * | 2/1980 | Meeker ..................... 297/256.13 |
| 4,688,850 A | * | 8/1987 | Brownlie et al. ........ 297/256.13 |
| 4,913,490 A | * | 4/1990 | Takahashi et al. ... 297/256.13 X |
| 5,957,531 A | * | 9/1999 | Kane et al. ................. 297/250.1 |

FOREIGN PATENT DOCUMENTS

JP H11291799 A 10/1999

* cited by examiner

*Primary Examiner* — Anthony D Barfield
(74) *Attorney, Agent, or Firm* — Winston Hsu; Scott Margo

(57) ABSTRACT

A collapsible support device adapted to be installed on a child safety seat is disclosed. The collapsible support device includes a first supporting part and a second supporting part. The second supporting part is pivotally connected to an end of the first supporting part to be capable of being collapsed to the first supporting part. Another end of the first supporting part is pivotally connected to the child safety seat. The first supporting part is selectively rotated relative to the child safety seat to be located at one of a use position and a storage position. The second supporting part is selectively rotated relative to the first supporting part to be located at one of a supporting position and a collapsed position. The collapsible support device has advantages of simple structure and providing operation convenience to users. Additionally, a child safety seat having the collapsible support device is also disclosed.

26 Claims, 12 Drawing Sheets

COLLAPSIBLE SUPPORT DEVICE AND CHILD SAFETY SEAT THEREWITH

BACKGROUND OF THE INVENTION

1. Field of the Invention

The invention relates to a children product, and especially relates to a collapsible support device and a child safety seat having the collapsible support device.

2. Description of the Prior Art

As economic growth increases and technical level improves, much abundant resources are provided to people, leading to continuous improvement in quality of living of people. Precisely because of the continuous improvement, a good platform for development is therefore provided for various consumer products. Therein, child safety seat is one of the various consumer products.

The child safety seat is equipment that is installed on a car seat and constrains a child on the child safety seat by a constraining device. When an emergency brake or an unexpected collision occurs, the child safety seat can reduce hurt to the child more than a car air bag. Therefore, the child safety seat is acceptable to customers rapidly and gradually spreads over the whole world.

Therein, in practice, some child safety seat may be used forward or rearward. When used in a forward way, the child safety seat needs to be adjusted in its height relative to the car seat in accordance with the height of the child, so that the child can be seated more comfortably and safely.

However, most child safety seats capable of being used forward or rearward have disadvantages of complex structural design, inconvenient operation, and inconvenience to adjustment in disposition angle of the child safety seat for children.

Therefore, there is a need for a collapsible support device, having simple structure and providing convenience of operation to users, and a child safety seat having the support device, so as to overcome the above disadvantages.

SUMMARY OF THE INVENTION

An objective of the invention is to provide a collapsible support device having simple structure and providing convenience of operation to users.

Another objective of the invention is to provide a child safety seat capable of being adjusted in sitting angle conveniently by users.

For the above purpose, the collapsible support device is adapted to be installed on a child safety seat. The collapsible support device includes a first supporting part and a second supporting part. The second supporting part is pivotally connected to an end of the first supporting part to be capable of being collapsed to the first supporting part. Another end of the first supporting part is pivotally connected to the child safety seat. The first supporting part is selectively rotated relative to the child safety seat to be located at one of a use position and a storage position. The second supporting part is selectively rotated relative to the first supporting part to be located at one of a supporting position and a collapsed position.

Preferably, when the first supporting part is located at the use position, the child safety seat is at a first forward use state. When the first supporting part is located at the storage position, the child safety seat is at a rearward use state. Further, when the first supporting part is located at the use position and the second supporting part is located at the supporting position, the child safety seat is at a second forward use state.

Therefore, a user can easily adjust the child safety seat for the sitting angle of a child sitting on the child safety seat.

Preferably, the collapsible support device further includes another one of the first supporting part and the two first supporting parts are disposed at two opposite sides of the second supporting part, so that the supporting of the first supporting part and the second supporting part to the child safety seat is more reliable.

Preferably, the collapsible support device further includes a limitation part and a rotation part. The rotation part rotatably passes through the second supporting part. The rotation part and the first supporting part are fixedly connected. An end of the limitation part is inserted into the first supporting part. Another end of the limitation part extends into the second supporting part. The second supporting part has a rotation room for the limitation part to extend into. The second supporting part has at least one positioning protrusion. A first position area and a second position area are formed between the positioning protrusion and a sidewall of the rotation room. When the second supporting part is rotated to locate the limitation part in the first positioning area, the second supporting part is located at the supporting position. When the second supporting part is rotated to locate the limitation part in the second positioning area, the second supporting part is located at the collapsed position. By use of the first positioning area and the second positioning area, the limitation part can be reliably located in the first positioning area or the second positioning area. By use of the limitation part and the rotation part, the second supporting part can be reliably rotated around the first supporting part. By use of the positioning protrusion, the second supporting part which enters the first positioning area or the second positioning area can be located, so that the second supporting part is selectively rotated relative to the first supporting part to keep being at the supporting position or the collapsed position.

Preferably, a bottom wall of the rotation room has a first separating hole and a first cantilever portion. The first cantilever portion protrudes in the first separating hole. The positioning protrusion is disposed to protrude on the first cantilever portion. Therein, by the positioning protrusion protruding on the first cantilever portion, when sliding into or out the first positioning area or the second positioning area, the limitation part pushes the positioning protrusion slightly into the second supporting part. When the limitation part gets rid of pushing the positioning protrusion and totally enters the first positioning area or the second positioning area, the positioning protrusion returns to the original state automatically, so as to achieve the purpose of locking the limitation part which totally enters the first positioning area or the second positioning area.

Preferably, the first supporting part has a bearing portion protruding toward the second supporting part. The rotation part is inserted into the bearing portion and fixedly connected to the bearing portion. Furthermore, the first supporting part has an insertion block protruding toward the second supporting part. The limitation part is sleeved on the insertion block. Therein, by use of the bearing portion, the installation of the rotation part onto the first supporting part is convenient. By use of the insertion block, the installation of the limitation part thereon is also convenient.

Preferably, the first supporting part has an engagement protrusion protruding outward in a direction away from a side of the second supporting part. The child safety seat has an engagement hole corresponding to the engagement protrusion. By the fitting of the engagement hole with the engagement protrusion, the first supporting part with the second supporting part collapsed therein can be engaged into the child safety seat more reliably, so as to achieve the purpose of the first supporting part with the second supporting part collapsed therein being stored at the bottom of the child safety seat reliably. In an embodiment, the first supporting part further has a second separating hole and a second cantilever portion. The second cantilever portion protrudes in the second separating hole. The engagement protrusion is disposed to protrude on the second cantilever portion. By the engagement protrusion protruding on the suspended second cantilever portion, the engagement protrusion is slightly pushed into the first supporting part by the child safety seat before engaging with the engagement hole, and then the engagement protrusion can lock the first supporting part which is stored, so that the first supporting part can work more reliably.

Preferably, the second supporting part includes a first supporting block and a second supporting block connected linearly with each other. The second supporting block fits in the first supporting block, so that the manufacturing of the second supporting part is easier and the supporting thereof is more reliable.

The child safety seat of the invention includes a seat body and a collapsible support device. The collapsible support device includes a first supporting part and a second supporting part. The second supporting part is pivotally connected to an end of the first supporting part to be capable of being collapsed to the first supporting part. Another end of the first supporting part is pivotally connected to the seat body. The first supporting part is selectively rotated relative to the seat body to be located at one of a use position and a storage position. The second supporting part is selectively rotated relative to the first supporting part to be located at one of a supporting position and a collapsed position.

Preferably, when the first supporting part is located at the use position, the child safety seat is at a first forward use state. When the first supporting part is located at the storage position, the child safety seat is at a rearward use state. Further, when the first supporting part is located at the use position and the second supporting part is located at the supporting position, the child safety seat is at a second forward use state. Therefore, a user can easily adjust the child safety seat for the sitting angle of a child sitting on the child safety seat.

Preferably, the collapsible support device further comprises another one of the first supporting part. The two first supporting parts are disposed at two opposite sides of the second supporting part, so that the supporting of the first supporting part and the second supporting part to the child safety seat is more reliable.

Preferably, the collapsible support device further includes a limitation part and a rotation part. The rotation part rotatably passes through the second supporting part. The rotation part and the first supporting part are fixedly connected. An end of the limitation part is inserted into the first supporting part. Another end of the limitation part extends into the second supporting part. The second supporting part has a rotation room for the limitation part to extend into. The second supporting part has at least one positioning protrusion. A first position area and a second position area are formed between the positioning protrusion and a sidewall of the rotation room. When the second supporting part is rotated to locate the limitation part in the first positioning area, the second supporting part is located at the supporting position. When the second supporting part is rotated to locate the limitation part in the second positioning area, the second supporting part is located at the collapsed position. By use of the first positioning area and the second positioning area, the limitation part can be reliably located in the first positioning area or the second positioning area. By use of the limitation part and the rotation part, the second supporting part can be reliably rotated around the first supporting part. By use of the positioning protrusion, the second supporting part which enters the first positioning area or the second positioning area can be located, so that the second supporting part is selectively rotated relative to the first supporting part to keep being at the supporting position or the collapsed position.

Preferably, a bottom wall of the rotation room has a first separating hole and a first cantilever portion. The first cantilever portion protrudes in the first separating hole. The positioning protrusion is disposed to protrude on the first cantilever portion. Therein, by the positioning protrusion protruding on the first cantilever portion, when sliding into or out the first positioning area or the second positioning area, the limitation part pushes the positioning protrusion slightly into the second supporting part. When the limitation part gets rid of pushing the positioning protrusion and totally enters the first positioning area or the second positioning area, the positioning protrusion returns to the original state automatically, so as to achieve the purpose of locking the positioning protrusion in the first positioning area or the second positioning area.

Preferably, the first supporting part has a bearing portion protruding toward the second supporting part. The rotation part is inserted into the bearing portion and fixedly connected to the bearing portion. Furthermore, the first supporting part has an insertion block protruding toward the second supporting part. The limitation part is sleeved on the insertion block. Therein, by use of the bearing portion, the installation of the rotation part onto the first supporting part is convenient. By use of the insertion block, the installation of the limitation part thereon is also convenient.

Preferably, the second supporting part includes a first supporting block and a second supporting block connected linearly with each other. The second supporting block fits in the first supporting block, so that the manufacturing of the second supporting part is easier and the supporting thereof is more reliable.

Preferably, the first supporting part has an engagement protrusion protruding outward in a direction away from a side of the second supporting part. The seat body has an engagement hole corresponding to the engagement protrusion. By the fitting of the engagement hole with the engagement protrusion, the first supporting part with the second supporting part collapsed therein can be engaged into the seat body more reliably, so as to achieve the purpose of the first supporting part with the second supporting part collapsed therein being stored at the bottom of the seat body reliably. In an embodiment, as follows:

The seat body has a storage room for the first supporting part to be stored in. The engagement hole is disposed on a bottom wall of the storage room. When the first supporting part is stored in the storage room, the engagement protrusion is engaged in the engagement hole. The purpose therefor is to store the first supporting part with the second supporting part collapsed therein at the bottom of the seat body, so as to ensure the reliability of rearward use of the child safety seat.

Furthermore, when the first supporting part is located at the use position, the first supporting part is against a sidewall of the storage room and the sidewall of the storage room supports the first supporting part, so that the first supporting part in the use position works more reliably.

Further, the first supporting part further has a second separating hole and a second cantilever portion. The second cantilever portion protrudes in the second separating hole. The engagement protrusion is disposed to protrude on the second cantilever portion. Thereby, the engagement protrusion is slightly pushed into the first supporting part by the seat body before engaging with the engagement hole, and then the engagement protrusion can lock the first supporting part which is stored, so that the first supporting part can work more reliably.

The second supporting part of the invention is pivotally connected to an end of the first supporting part to be capable of being collapsed to the first supporting part. Another end of the first supporting part is pivotally connected to the child safety seat. The first supporting part is selectively rotated relative to the child safety seat to be located at one of a use position and a storage position. Furthermore, the second supporting part is selectively rotated relative to the first supporting part to be located at one of a supporting position and a collapsed position. Therefore, the collapsible support device of the invention achieves the purpose of quickly and conveniently changing the child safety seat in forward or rearward use just by changing the position of the first supporting part relative to the child safety seat and the position of the second supporting part relative to the first supporting part, and achieves the purpose of adjusting the sitting angle of the child safety seat in forward use by switching the child safety seat between the first forward use sate and the second forward use state. Therefore, the collapsible support device of the invention has simple structure and providing convenience of operation to users. Furthermore, the child safety seat of the invention has the collapsible support device of the invention, so that the child safety seat of the invention has the function of adjusting the sitting angle.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
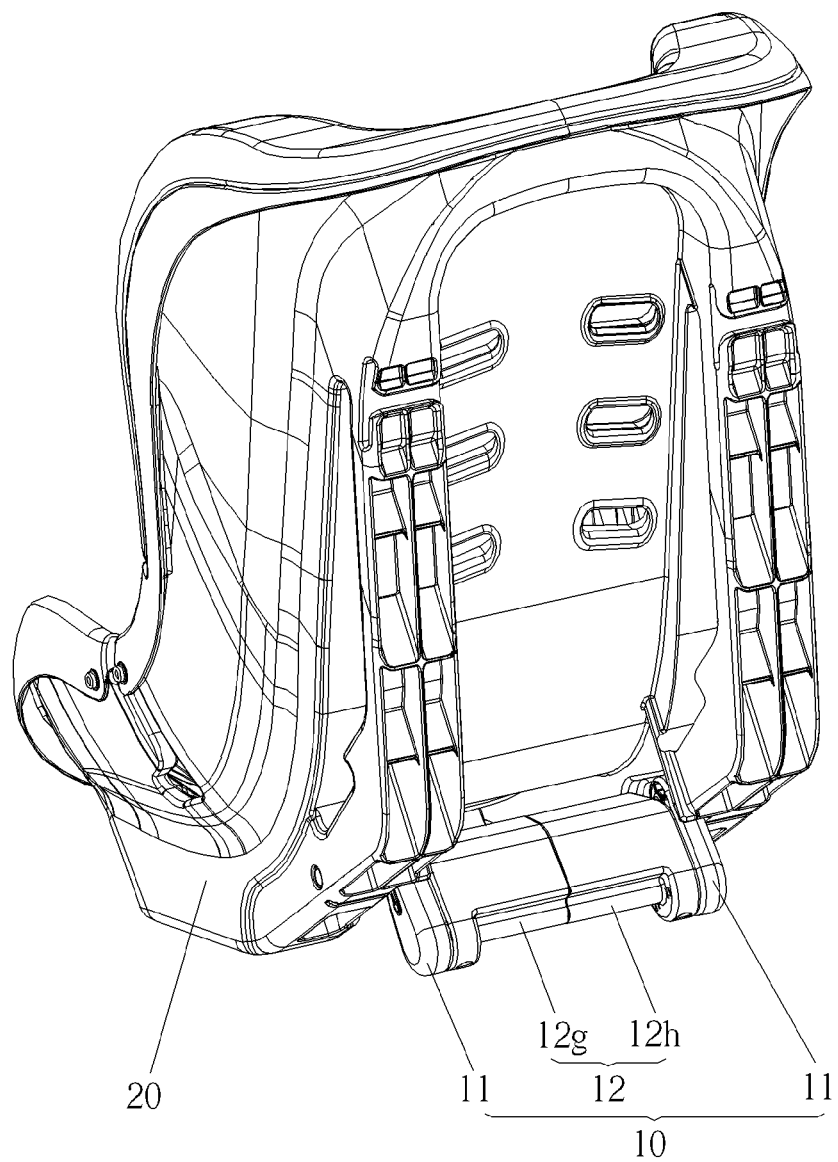
FIG. 1 is a schematic diagram illustrating a child safety seat of the invention being at a first forward use state.
Figure 2:
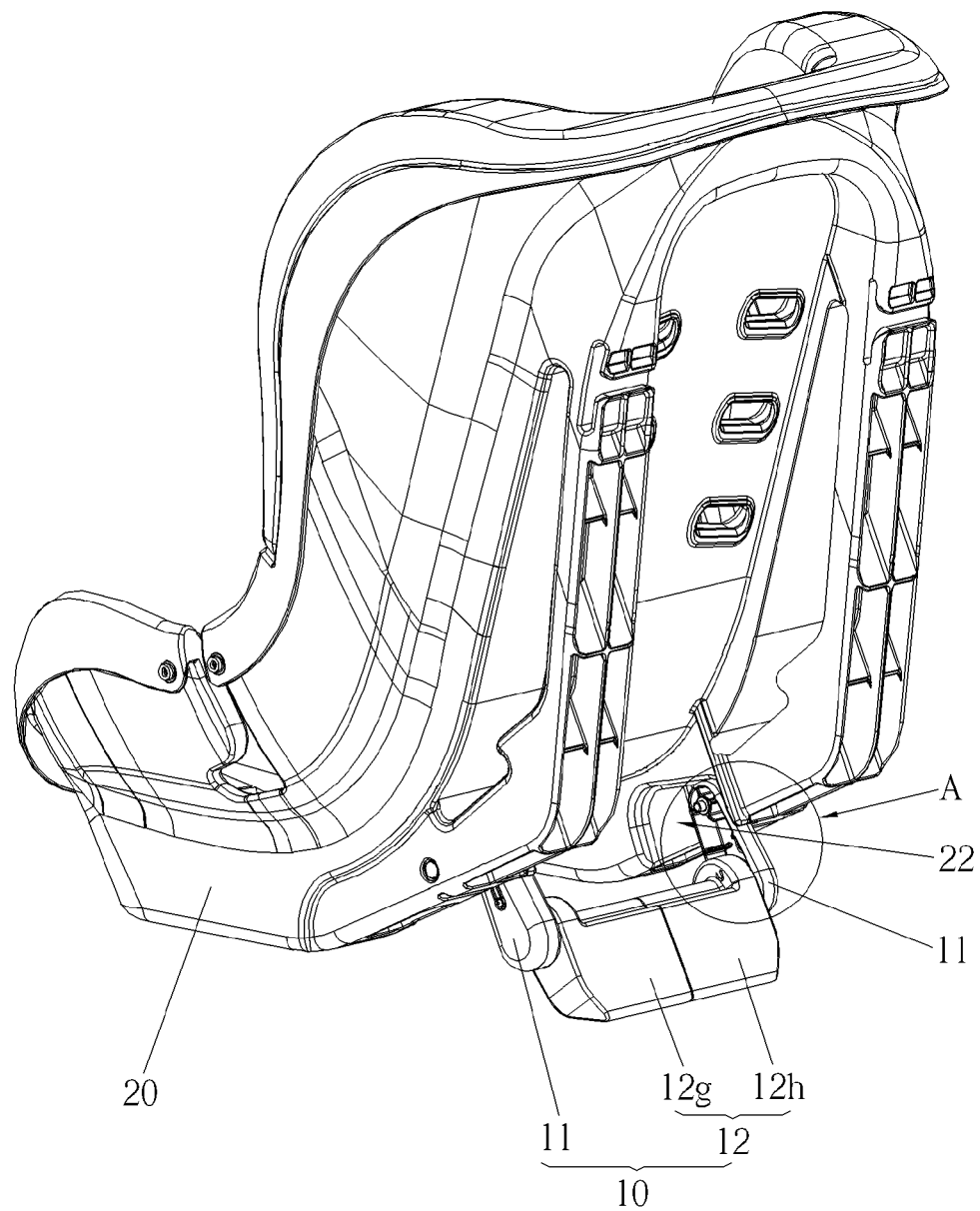
FIG. 2 is a schematic diagram illustrating the child safety seat of the invention being at a second forward use state.
Figure 3:
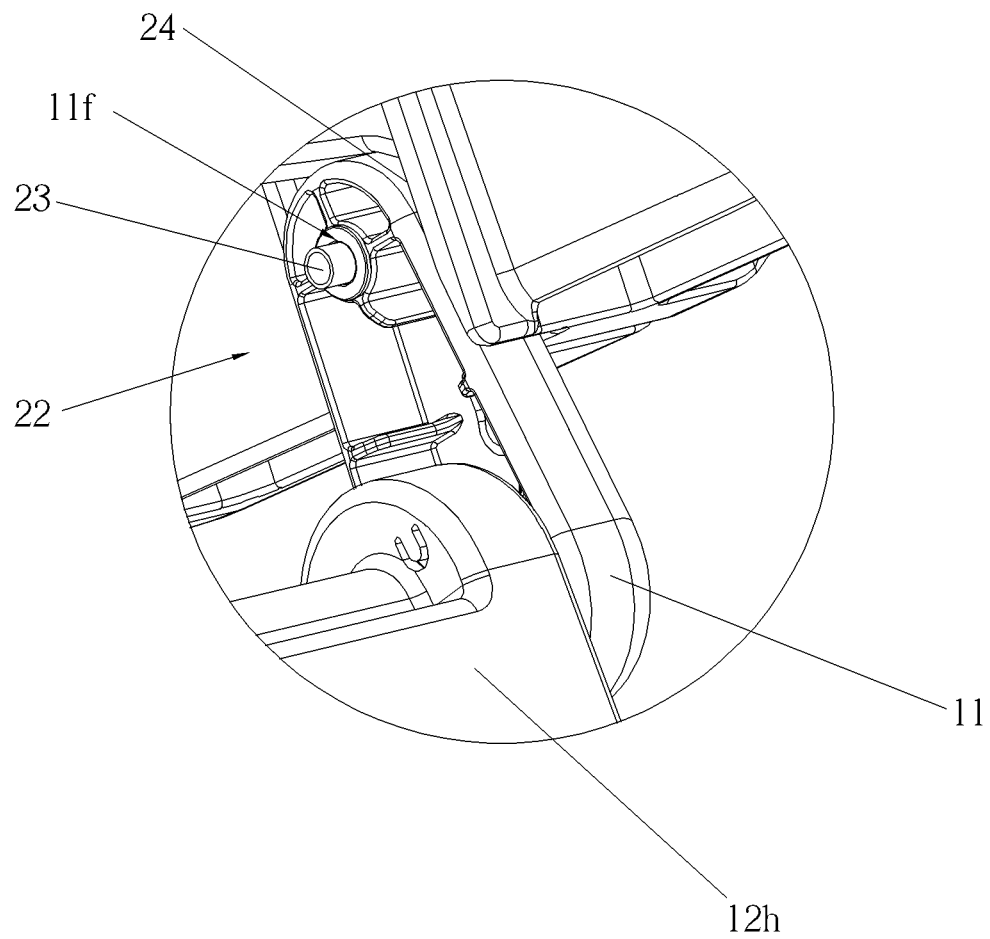
FIG. 3 is an enlarged view of the A portion in FIG. 2.
Figure 4:
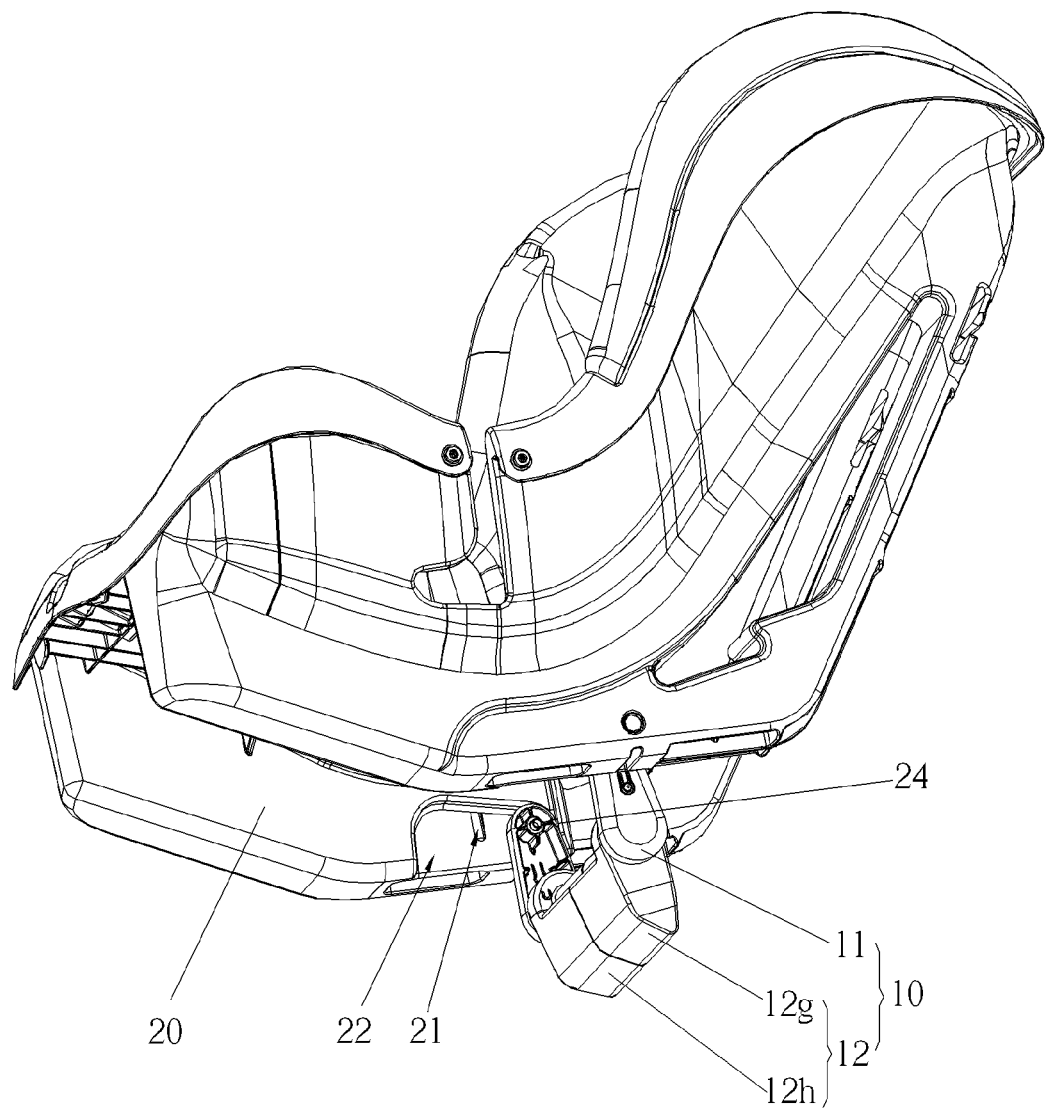
FIG. 4 is another schematic diagram illustrating the child safety seat in FIG. 2 in another view point.

Please refer to FIGS. 1 through 4. A child safety seat 100 of the invention includes a seat body 20 and a collapsible support device 10. The collapsible support device 10 includes a first supporting part 11 and a second supporting part 12. The second supporting part 12 is capable of being collapsed to the first supporting part 11. The second supporting part 12 is pivotally connected to an end of the first supporting part 11. The other end of the first supporting part 11 is pivotally connected to the seat body 20. In the embodiment, the first supporting part 11 has a circular installation hole 11f; the seat body 20 has a protrusive circular installation shaft 23 correspondingly. The installation shaft 23 fittingly passes through the installation hole 11f and protrudes out, so that the first supporting part 11 can be rotated around the installation shaft 23, so as to achieve the purpose of the first supporting part 11 being pivotally connected to the seat body 20. Furthermore, the first supporting part 11 is selectively rotated relative to the seat body 20 to keep being at a use position (i.e. the position where the first supporting part 11 protrudes out the seat body 20 in FIG. 1) or a storage position (i.e. the position where the first supporting part 11 is stored in the seat body 20 in FIG. 12).

Figure 5:
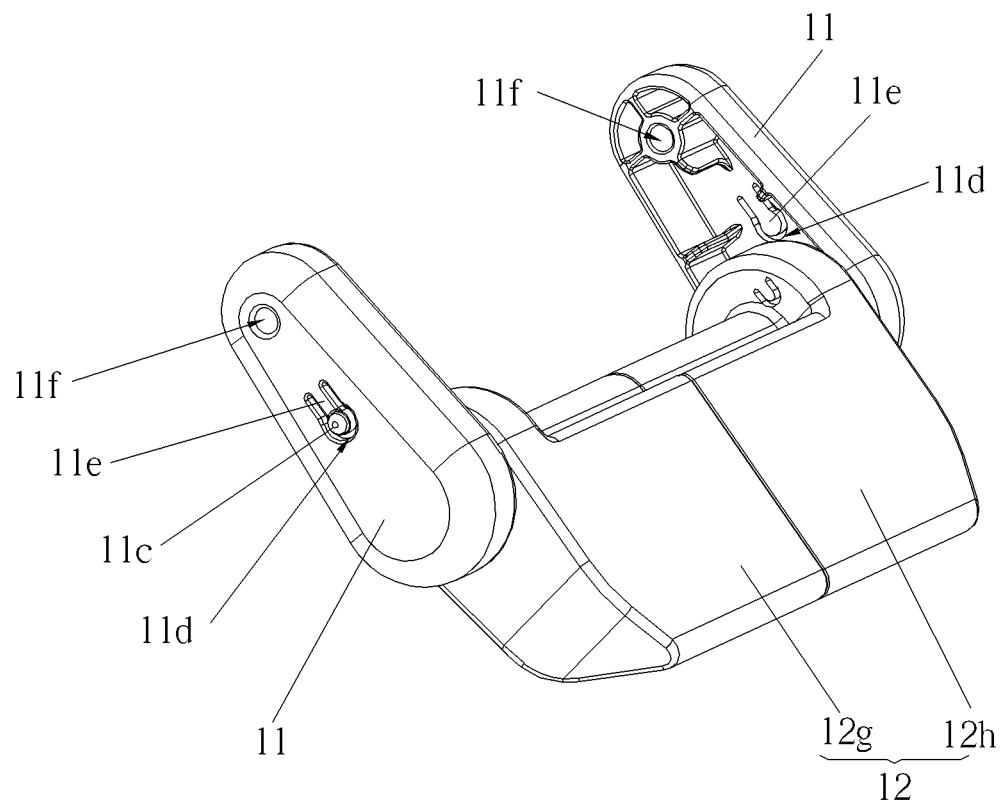
FIG. 5 is a schematic diagram illustrating a collapsible support device of the invention, wherein a second supporting part thereof is located at a supporting position relative to first supporting parts thereof.
Figure 6:
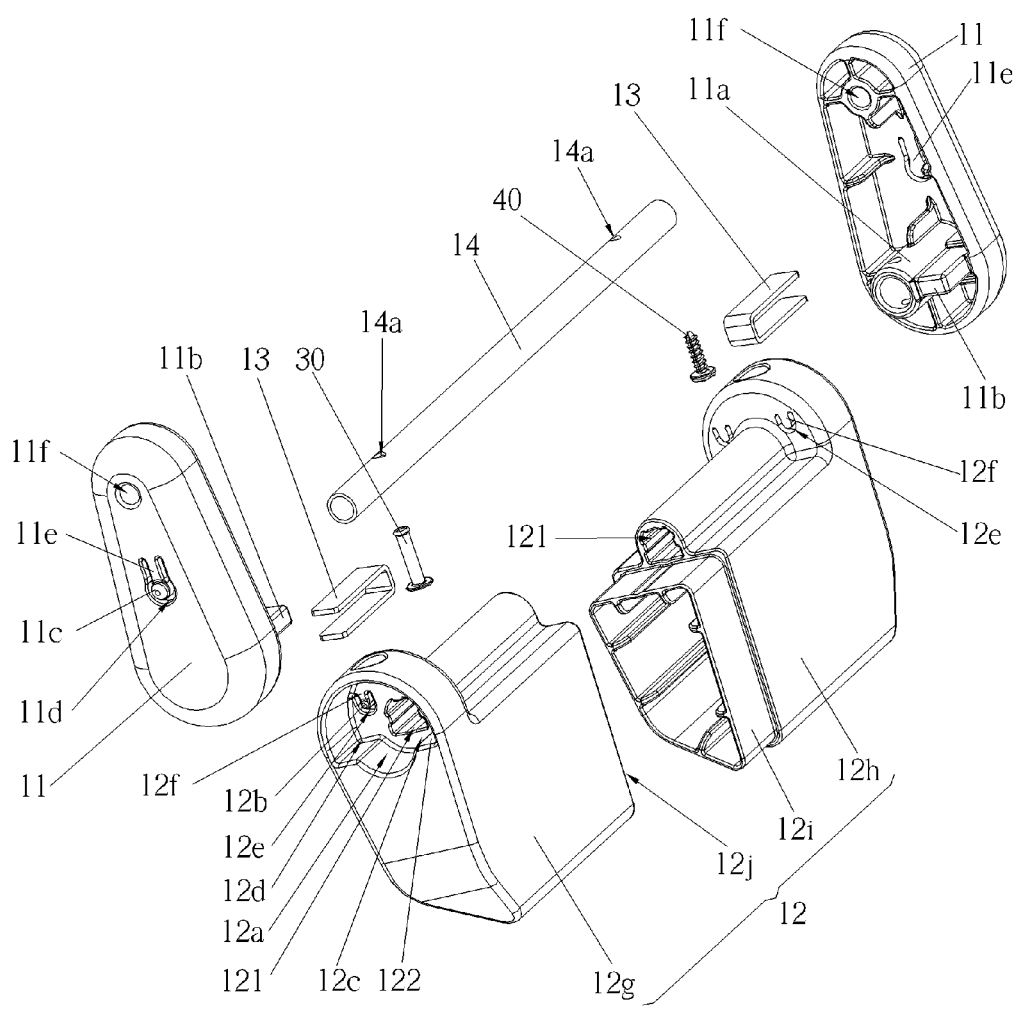
FIG. 6 is an exploded view of the collapsible support device in FIG. 5.
Figure 8:
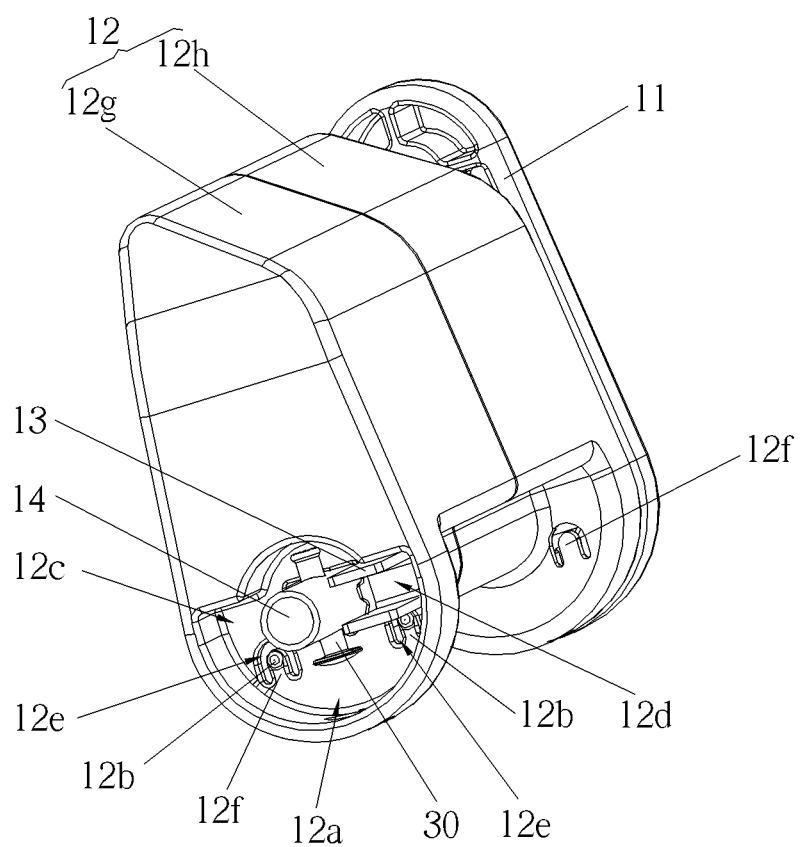
FIG. 8 is a schematic diagram illustrating the collapsible support device in FIG. 7, of which the second supporting part is located at a collapsed position relative to the first supporting part.
Figure 9:
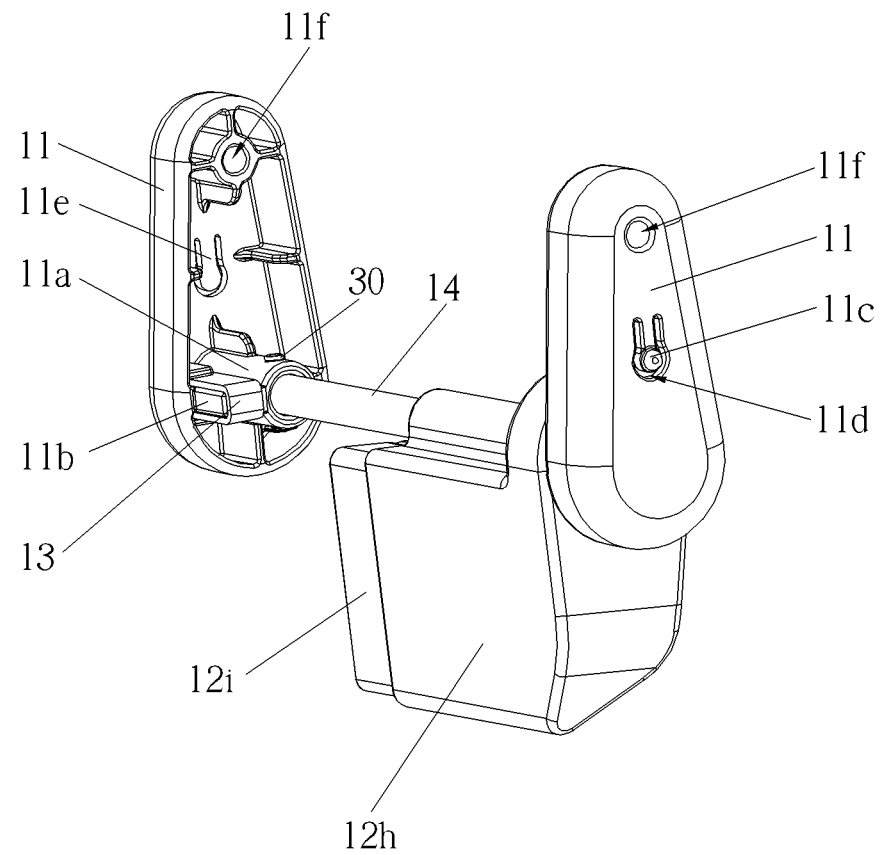
FIG. 9 is a schematic diagram illustrating the collapsible support device, of which a first supporting block of the second supporting part is detached.
Figure 10:
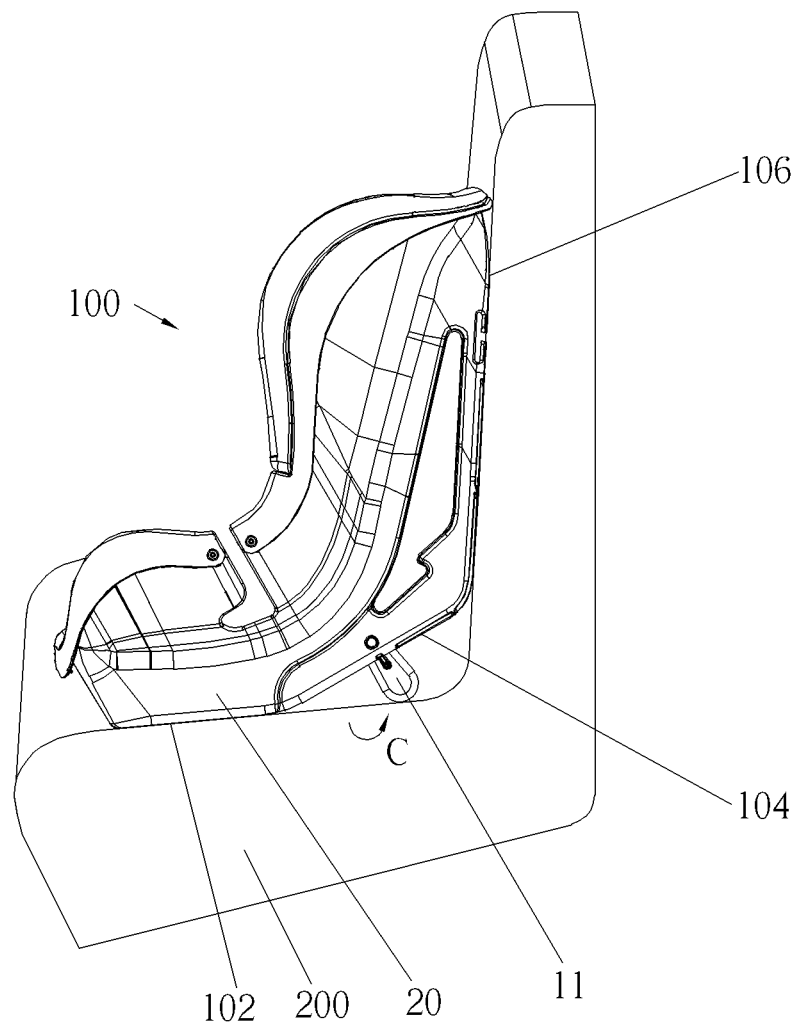
FIG. 10 is a schematic diagram illustrating the child safety seat installed on a car seat to be at the first forward use state.
Figure 11:
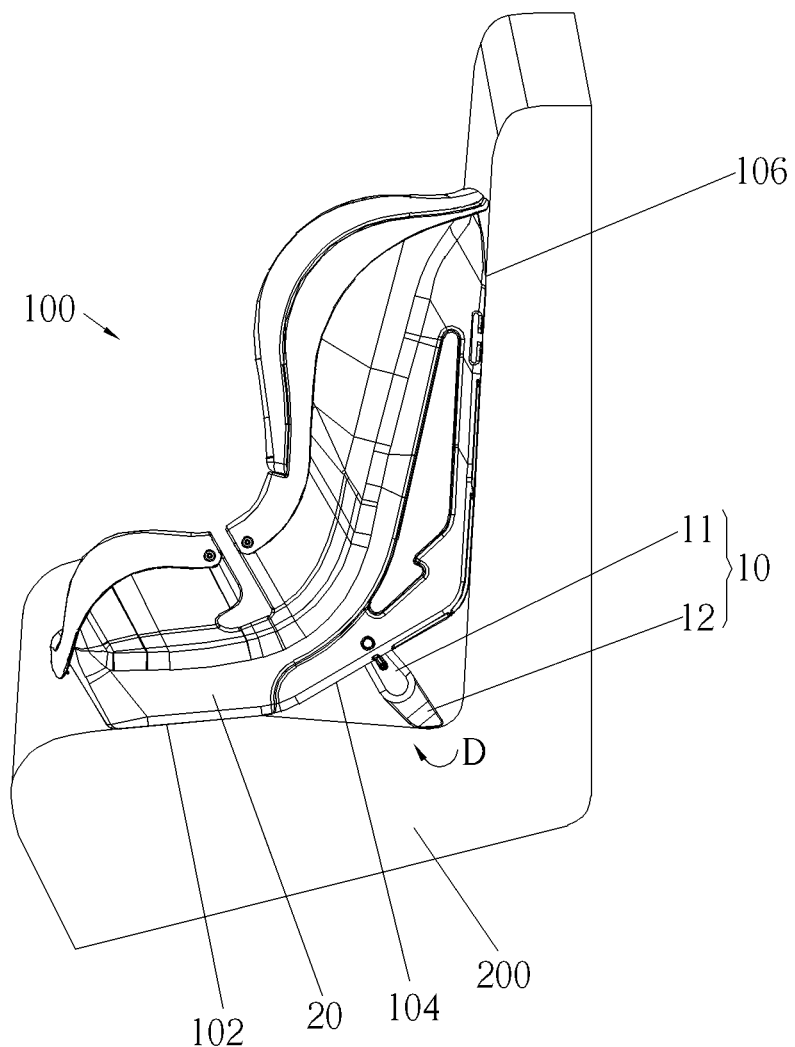
FIG. 11 is a schematic diagram illustrating the child safety seat installed on the car seat to be at the second forward use state.
Figure 12:
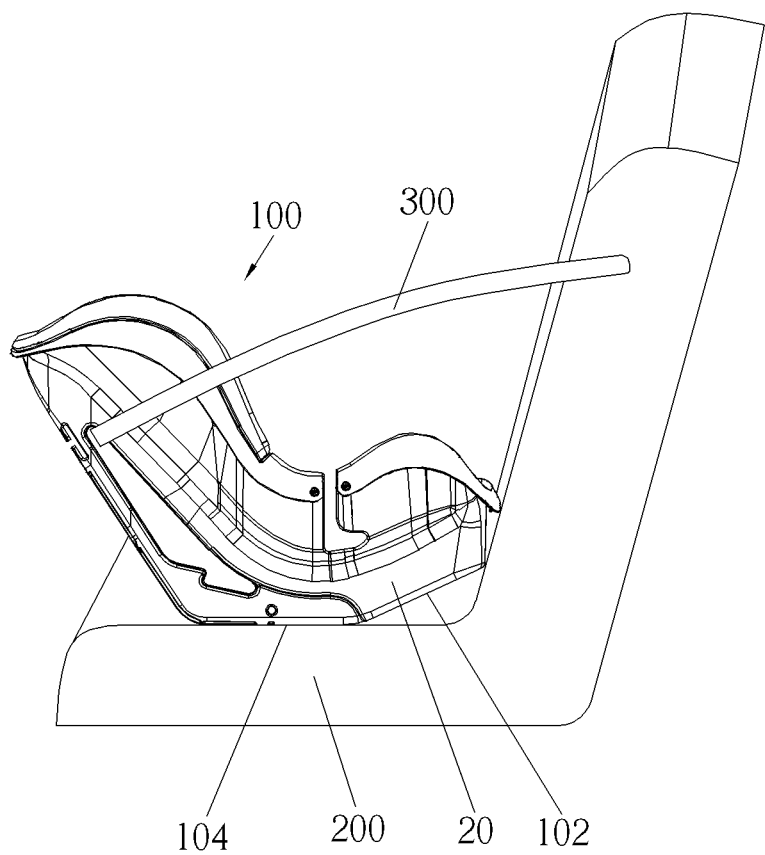
FIG. 12 is a schematic diagram illustrating the child safety seat installed on the car seat to be at a rearward use state.

The second supporting part 12 is selectively rotated relative to the first supporting part 11 to keep being at a supporting position (i.e. the position where the second supporting part 12 protrudes out the first supporting part 11 in FIG. 5) or a collapsed position (i.e. the position where the second supporting part 12 is collapsed to the first supporting part 11 in FIG. 8). When the first supporting part 11 is located at the use position and the second supporting part 12 is located at the collapsed position, the child safety seat 100 of the invention is at the first forward use state, as shown by FIG. 10. When the first supporting part 11 is located at the use position and the second supporting part 12 is located at the supporting position, the child safety seat 100 of the invention is at the second forward use state, as shown by FIG. 11. When the first supporting part 11 is located at the storage position and the second supporting part 12 is located at the collapsed position, the child safety seat 100 of the invention is at the rearward use state, as shown by FIG. 12. Therein, for more reliable supporting of the first supporting part 11 and the second supporting part 12 to the seat body 20, the first supporting part 11 is disposed in pair at two opposite sides of the second supporting part 12; that is, the second supporting part 12 is located between the two first supporting parts 11. In an embodiment, as follows:

Please refer to FIGS. 6 through 9. The collapsible support device 10 further includes a limitation part 13 and a cylindrical rotation part 14. The rotation part 14 rotatably passes through the second supporting part 12. In practice, the second supporting part 12 has a pivotal connection hole 121 for the rotation part 14 to pass through. By use of the pivotal connection hole 121, the purpose of the rotation part 14 passing through the second supporting part 12 is achieved. The rotation part 14 and the first supporting part 11 are fixedly connected. In the embodiment, the fixedly connecting way for the rotation part 14 and the first supporting part 11 is to dispose fixing holes 14a at two ends of the rotation part 14. The first supporting part 11 has a bearing portion 11a protruding toward the second supporting part 12. The bearing portion 11a is used for bearing the rotation part 14 and made in hollow structure. The two ends of the rotation part 14 are inserted into the bearing portions 11a. One end of the rotation part 14 is fixedly connected to the bearing portion 11a of the first supporting part 11 by a rivet 30. The other end of the rotation part 14 is fixedly connected to the bearing portion 11a of the other first supporting part 11 by a screw 40. Thereby, the installation of the rotation part 14 onto the first supporting part 11 is conveniently performed, so as to achieve the purpose of the rotation part 14 being fixedly connected to the first supporting part 11.

Figure 7:
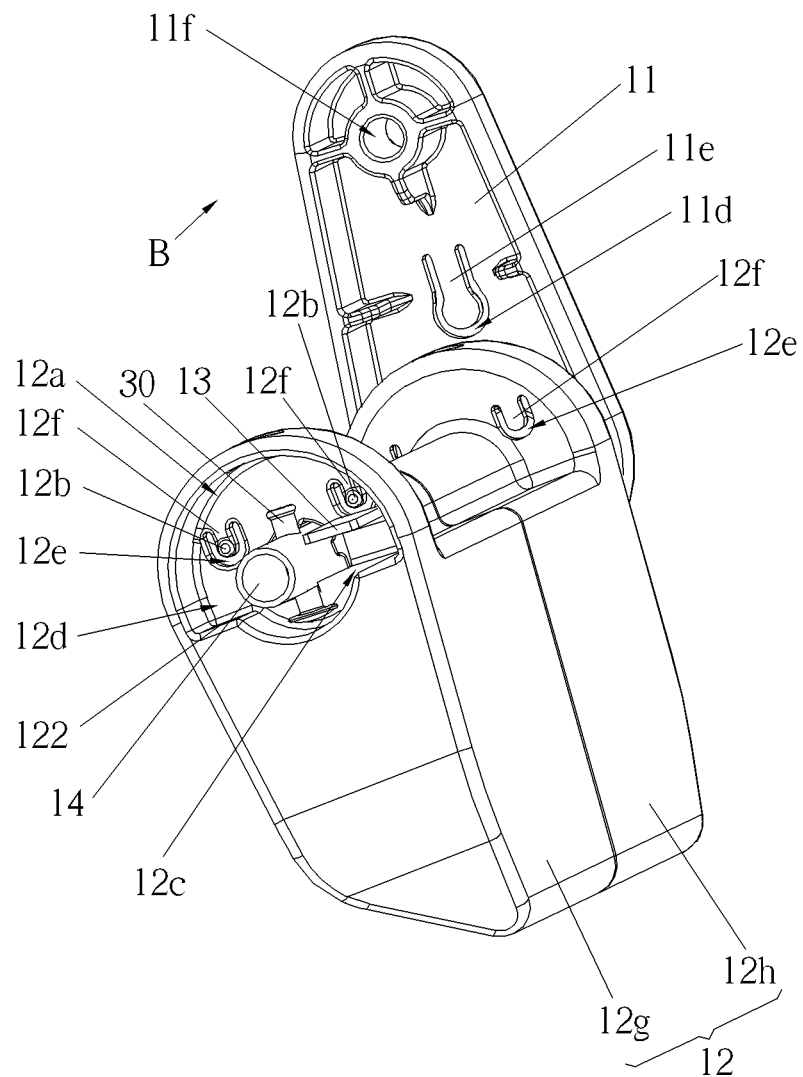
FIG. 7 is a schematic diagram illustrating the collapsible support device in FIG. 5, of which one of the first supporting parts is detached.

Furthermore, an end of the limitation part 13 is inserted into the first supporting part 11. Another end of the limitation part 13 extends into the second supporting part 12. The way for inserting the limitation part 13 into the first supporting part 11 is described in the following. The first supporting part 11 has an insertion block 11b protruding toward the second supporting part 12. The insertion block 11b and the bearing portion 11a are parallel. The limitation part 13 is sleeved on the insertion block 11b, so as to achieve the purpose of inserting the limitation part 13 into the first supporting part 11. Further, the second supporting part 12 has a rotation room 12a for the limitation part 13 to extend into. The second supporting part 12 has at least one positioning protrusion 12b. The positioning protrusion 12b protrudes from the second supporting part 12 into the rotation room 12a in the passing-through direction of the rotation part 14. In practice, there are two positioning protrusions 12b. The two positioning protrusions 12b are arranged in a line in the rotation room 12a. The two positioning protrusion 12b and a sidewall 122 of the rotation room 12a form a first positioning area 12c and a second positioning area 12d. When the second supporting part 12 is rotated in an anticlockwise direction in FIG. 8, such that the limitation part 13 is located in the first positioning area 12c, the second supporting part 12 is located at the supporting position, as shown by FIG. 7. When the second supporting part 12 is rotated in a direction indicated by an arrow B in FIG. 7, such that the limitation part 13 is located in the second positioning area 12d, the second supporting part 12 is located at the collapsed position, as shown by FIG. 8. By use of the first positioning area 12c and the second positioning area 12d, the limitation part 13 can be located in the first positioning area 12c or the second positioning area 12d reliably. By use of the limitation part 13 and the rotation part 14, the second supporting part 12 can be rotated around the first supporting part 11 reliably. By use of the positioning protrusion 12b, the second supporting part 12 which enters the first positioning area 12c or the second positioning area 12d can be located, so that the second supporting part 12 is selectively rotated relative to the first supporting part 11 to keep being at the supporting position or the collapsed position. Therein, when the limitation part 13 totally enters the first positioning area 12c or the second positioning area 12d, the limitation part 13 gets rid of pushing the positioning protrusion 12b. The positioning protrusion 12b returns to the original state automatically, so as to achieve the purpose of locking the limitation part 13 which totally enters the first positioning area or the second positioning area. In practice, a bottom wall of the rotation room 12a has a first separating hole 12e and a first cantilever portion 12f. The first cantilever portion 12f protrudes from the bottom wall of the rotation room 12a in the first separating hole 12e. The positioning protrusion 12b is disposed to protrude on the first cantilever portion 12f. Preferably, the rotation room 12a is designed in semi-circle shape. The first positioning area 12c and the second positioning area 12d are formed between the positioning protrusion 12b and the sidewall 122 of the rotation room 12a. The structure thereof is simple and convenient for the limitation part 13 to rotate in the rotation room 12a.

Please refer to FIGS. 5 through 9. The second supporting part 12 includes a first supporting block 12g and a second supporting block 12h connected linearly with each other. The second supporting block 12h fits in the first supporting block 12g, so that the manufacturing of the second supporting part 12 is easier and the supporting thereof is more reliable. In practice, the second supporting block 12h has a sleeve portion 12i protruding toward the first supporting block 12g. The first supporting block 12g has a sleeve room 12j corresponding to the sleeve portion 12i. By the fitting of the sleeve portion 12i and the sleeve room 12j, the first supporting block 12g is sleeved on the second supporting block 12h, so that the first supporting block 12g and the second supporting block 12h are at a linearly-connected state after the fitting. Furthermore, for more reliable contact between the second supporting part 12 and a car seat 200 (shown in FIG. 11), the bottom end of the second supporting part 12 is designed be a flat contact surface.

Please refer to FIGS. 1 through 7 and FIG. 9. The first supporting part 11 has an engagement protrusion 11c protruding outward in a direction away from a side of the second supporting part 12. The seat body 20 has an engagement hole 21 (referring to FIG. 4) corresponding to the engagement protrusion 11c. By the fitting of the engagement hole 21 with the engagement protrusion 11c, the first supporting part 11 can be engaged into the seat body 20 reliably so as to achieve the purpose of the first supporting part 11 with the second supporting part 12 collapsed therein being stored at the bottom of the seat body 20 reliably.

In the embodiment, the seat body 20 has a storage room 22 for the first supporting part 11 to be stored in. The engagement hole 21 is disposed on a bottom wall of the storage room 22. When the first supporting part 11 is stored in the storage room 22, the engagement protrusion 11c is engaged in the engagement hole 21. The purpose therefor is to store the first supporting part 11 with the second supporting part 12 collapsed therein at the bottom of the seat body 20, so as to ensure the reliability of rearward use of the child safety seat 100.

Furthermore, the first supporting part 11 has a second separating hole 11d and a second cantilever portion 11e. The second cantilever portion 11e protrudes in the second separating hole lid. The engagement protrusion 11c is disposed to protrude on the second cantilever portion 11e. Thereby, the engagement protrusion 11c is slightly pushed into the first supporting part 11 by the seat body 20 before engaging with the engagement hole 21, and then the engagement protrusion 11c can lock the first supporting part 11 which is stored, so that the first supporting part 11 can work more reliably. Furthermore, when the first supporting part 11 is located at the use position, the first supporting part 11 is against a sidewall 24 of the storage room 22 and the sidewall 24 of the storage room 22 supports the first supporting part 11.

It is worth notice that the collapsible support device 10 of the invention has been illustrated in the process of describing the child safety seat 100 of the invention, which will not be described herein in addition.

Description for an adjustment of the child safety seat 100 of the invention to the car seat 200 is based on the combination of FIGS. 10 through 12. When the child safety seat 100 is used as a forward-use child safety seat, the first supporting part 11 is rotated to the use position. At this moment, the second supporting part 12 is located at the collapsed position (that is the second supporting part 12 is collapsed to the first supporting part 11), so that the child safety seat 100 of the invention is at the first forward use state, as shown by FIG. 10, by the first supporting part 11 and a first supporting surface 102 and a seat back surface 106 of the seat body 20 contacting the car seat 200.

If the child safety seat 100 of the invention is required to be boosted further to be at the second forward use state, as shown by FIG. 11, the second supporting part 12 can be rotated in a direction indicated by an arrow C in FIG. 10, so as to locate the second supporting part 12 at the supporting position and to expand the second supporting part 12 out the first supporting part 11. At this moment, the child safety seat 100 is at the second forward use state, as shown by FIG. 11, by the second supporting part 12 and first supporting surface 102 and the seat back surface 106 of the seat body 20 contacting the car seat 200.

If the child safety seat 100 of the invention is to be installed on the car seat 200 to be used in the rearward use for infant, the second supporting part 12 can be rotated in a direction indicated by an arrow D in FIG. 11 to be collapsed to the first supporting part 11 first. The first supporting part 11 with the second supporting part 12 collapsed therein is then stored onto the seat body 20. At last, the child safety seat 100 of the invention is installed onto the car seat 200 and fixed on the car seat 200 by a fastening strap 300. At this moment, the child safety seat 100 at the rearward use state, as shown by FIG. 12, by a second supporting surface 104 of the seat body 20 contacting the car seat 200.

The second supporting part 12 of the invention is pivotally connected to one end of the first supporting part 11 to be capable of being collapsed to the first supporting part 11. The other end of the first supporting part 11 is pivotally connected to the seat body 20. The first supporting part 11 is selectively rotated relative to the seat body 20 to be located at one of the use position and the storage position. Furthermore, the second supporting part 12 is selectively rotated relative to the first supporting part 11 to be located at one of the supporting position and the collapsed position. Therefore, the child safety seat 100 of the invention is supported by the first supporting part 11 when the first supporting part 11 is located at the use position and the second supporting part 12 at the collapsed position, so that the child safety seat 100 of the invention is at the first forward use state by the first supporting part 11 and the first supporting surface 102 and the seat back surface 106 of the seat body 20 contacting the car seat 200. When the first supporting part 11 is located at the use position and the second supporting part 12 is located at the supporting position, the child safety seat 100 of the invention is supported by the first supporting part 11 through the second supporting part 12 so as to be boosted further, so that the child safety seat 100 of the invention is at the second forward use state by the second supporting part 12 and the first supporting surface 102 and the seat back surface 106 of the seat body 20 contacting the car seat 200. When the first supporting part 11 is located at the storage position and the second supporting part 12 is located at the collapsed position, the first supporting part 11 and the second supporting part 12 are stored in the bottom of the seat body 20, so that the child safety seat 100 of the invention can be at the rearward use state by the second supporting surface 104 of the seat body 20 contacting the car seat 200. Therefore, the collapsible support device 10 of the invention achieves the purpose of quickly and conveniently changing the child safety seat 100 in forward or rearward use just by changing the position of the first supporting part 11 relative to the child safety seat 100 and the position of the second supporting part 12 relative to the first supporting part 11, and achieves the purpose of adjusting the sitting angle of the child safety seat 100 in forward use by switching the child safety seat 100 between the first forward use sate and the second forward use state. Therefore, the collapsible support device 10 of the invention has simple structure and providing convenience of operation to users. The child safety seat 100 of the invention has a wider use range because of having the collapsible support device 10 and is suitable for infants in various ages and bodies. Furthermore, the switching between the first forward use state and the second forward use state of the child safety seat 100 of the invention is performed by rotating the second supporting part 12 on the first supporting part 11, so that the child safety seat 100 of the invention has the function of adjusting the sitting angle.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A collapsible support device, adapted to be installed on a child safety seat, the collapsible support device comprising a first supporting part, a second supporting part, and a limitation part, the second supporting part having at least one positioning protrusion and being pivotally connected to an end of the first supporting part to be capable of being collapsed to the first supporting part, an end of the limitation part being inserted into the first supporting part, another end of the limitation part extending into the second supporting part, the second supporting part being selectively rotated relative to the first supporting part to be located at one of a supporting position and a collapsed position by the positioning protrusion interacting with the limitation part, wherein when the collapsible support device is installed on the child safety seat, another end of the first supporting part is pivotally connected to the child safety seat and the first supporting part is selectively rotated relative to the child safety seat to be located at one of a use position and a storage position.

2. The collapsible support device of claim 1, wherein when the first supporting part is located at the use position, the child safety seat is at a first forward use state, and when the first supporting part is located at the storage position, the child safety seat is at a rearward use state.

3. The collapsible support device of claim 2, wherein when the first supporting part is located at the use position and the second supporting part is located at the supporting position, the child safety seat is at a second forward use state.

4. The collapsible support device of claim 1, further comprising another one of the first supporting part, the two first supporting parts being disposed at two opposite sides of the second supporting part.

5. The collapsible support device of claim 1, further comprising a rotation part, the rotation part rotatably passing through the second supporting part, the rotation part and the first supporting part being fixedly connected, the second supporting part having a rotation room for the limitation part to extend into, a first position area and a second position area being formed between the positioning protrusion and a sidewall of the rotation room, when the second supporting part is rotated to locate the limitation part in the first positioning area, the second supporting part being located at the supporting position, when the second supporting part is rotated to locate the limitation part in the second positioning area, the second supporting part being located at the collapsed position.

6. The collapsible support device of claim 5, wherein a bottom wall of the rotation room has a first separating hole and a first cantilever portion, the first cantilever portion protrudes in the first separating hole, and the positioning protrusion is disposed to protrude on the first cantilever portion.

7. The collapsible support device of claim 5, wherein the first supporting part has a bearing portion protruding toward the second supporting part, and the rotation part is inserted into the bearing portion and fixedly connected to the bearing portion.

8. The collapsible support device of claim 5, wherein the first supporting part has an insertion block protruding toward the second supporting part, and the limitation part is sleeved on the insertion block.

9. The collapsible support device of claim 1, wherein the first supporting part has an engagement protrusion protruding outward in a direction away from a side of the second supporting part, and the child safety seat has an engagement hole corresponding to the engagement protrusion.

10. The collapsible support device of claim 9, wherein the first supporting part further has a second separating hole and a second cantilever portion, the second cantilever portion protrudes in the second separating hole, and the engagement protrusion is disposed to protrude on the second cantilever portion.

11. The collapsible support device of claim 1, wherein the second supporting part comprises a first supporting block and a second supporting block connected linearly with each other, and the second supporting block fits in the first supporting block.

12. A child safety seat, comprising a seat body and a collapsible support device, the collapsible support device comprising a first supporting part, a second supporting part, and a limitation part, the second supporting part having at least one positioning protrusion and being pivotally connected to an end of the first supporting part to be capable of being collapsed to the first supporting part, another end of the first supporting part being pivotally connected to the seat body, the first supporting part being selectively rotated relative to the seat body to be located at one of a use position and a storage position, an end of the limitation part being inserted into the first supporting part, another end of the limitation part extending into the second supporting part, the second supporting part being selectively rotated relative to the first supporting part to be located at one of a supporting position and a collapsed position by the positioning protrusion interacting with the limitation part.

13. The child safety seat of claim 12, wherein when the first supporting part is located at the use position, the child safety seat is at a first forward use state, and when the first supporting part is located at the storage position, the child safety seat is at a rearward use state.

14. The child safety seat of claim 13, wherein when the first supporting part is located at the use position and the second supporting part is located at the supporting position, the child safety seat is at a second forward use state.

15. The child safety seat of claim 12, wherein the collapsible support device further comprises another one of the first supporting part, and the two first supporting parts are disposed at two opposite sides of the second supporting part.

16. The child safety seat of claim 12, wherein the collapsible support device further comprises a rotation part, the rotation part rotatably passes through the second supporting part, the rotation part and the first supporting part are fixedly connected, the second supporting part has a rotation room for the limitation part to extend into, a first position area and a second position area are formed between the positioning protrusion and a sidewall of the rotation room, when the second supporting part is rotated to locate the limitation part in the first positioning area, the second supporting part is located at the supporting position, and when the second supporting part is rotated to locate the limitation part in the second positioning area, the second supporting part is located at the collapsed position.

17. The child safety seat of claim 16, wherein a bottom wall of the rotation room has a first separating hole and a first cantilever portion, the first cantilever portion protrudes in the first separating hole, and the positioning protrusion is disposed to protrude on the first cantilever portion.

18. The child safety seat of claim 16, wherein the first supporting part has a bearing portion protruding toward the second supporting part, and the rotation part is inserted into the bearing portion and fixedly connected to the bearing portion.

19. The child safety seat of claim 16, wherein the first supporting part has an insertion block protruding toward the second supporting part, and the limitation part is sleeved on the insertion block.

20. The child safety seat of claim 12, wherein the second supporting part comprises a first supporting block and a second supporting block connected linearly with each other, and the second supporting block fits in the first supporting block.

21. The child safety seat of claim 12, wherein the first supporting part has an engagement protrusion protruding outward in a direction away from a side of the second supporting part, and the seat body has an engagement hole corresponding to the engagement protrusion.

22. The child safety seat of claim 21, wherein the seat body has a storage room for the first supporting part to be stored in, the engagement hole is disposed on a bottom wall of the storage room, and when the first supporting part is stored in the storage room, the engagement protrusion is engaged in the engagement hole.

23. The child safety seat of claim 22, wherein when the first supporting part is located at the use position, the first supporting part is against a sidewall of the storage room and the sidewall of the storage room supports the first supporting part.

24. The child safety seat of claim 21, wherein the first supporting part further has a second separating hole and a second cantilever portion, the second cantilever portion protrudes in the second separating hole, and the engagement protrusion is disposed to protrude on the second cantilever portion.

25. A collapsible support device, adapted to be installed on a child safety seat, the collapsible support device comprising a first supporting part and a second supporting part, the second supporting part being pivotally connected to an end of the first supporting part to be capable of being collapsed to the first supporting part, the second supporting part being selectively rotated relative to the first supporting part to be located at one of a supporting position and a collapsed position, the first supporting part having an engagement protrusion, a second separating hole, and a second cantilever portion, the engagement protrusion being disposed on the second cantilever portion and protruding outward in a direction away from a side of the second supporting part, the second cantilever portion protruding in the second separating hole, wherein when the collapsible support device is installed on the child safety seat, another end of the first supporting part being pivotally connected to the child safety seat and the first supporting part is selectively rotated relative to the child safety seat to be located at one of a use position and a storage position.

26. A child safety seat, comprising a seat body and a collapsible support device, the collapsible support device comprising a first supporting part and a second supporting part, the second supporting part being pivotally connected to an end of the first supporting part to be capable of being collapsed to the first supporting part, another end of the first supporting part being pivotally connected to the seat body, the first supporting part being selectively rotated relative to the seat body to be located at one of a use position and a storage position, the second supporting part being selectively rotated relative to the first supporting part to be located at one of a supporting position and a collapsed position, the first supporting part having an engagement protrusion, a second separating hole, and a second cantilever portion, the engagement protrusion being disposed on the second cantilever portion and protruding outward in a direction away from a side of the second supporting part, the second cantilever portion protruding in the second separating hole, the seat body having an engagement hole corresponding to the engagement protrusion.

* * * * *